Aug. 7, 1934.   T. J. SMULSKI   1,969,105
THERMORESPONSIVE ELECTRIC CONTROLLER
Filed Oct. 4, 1930
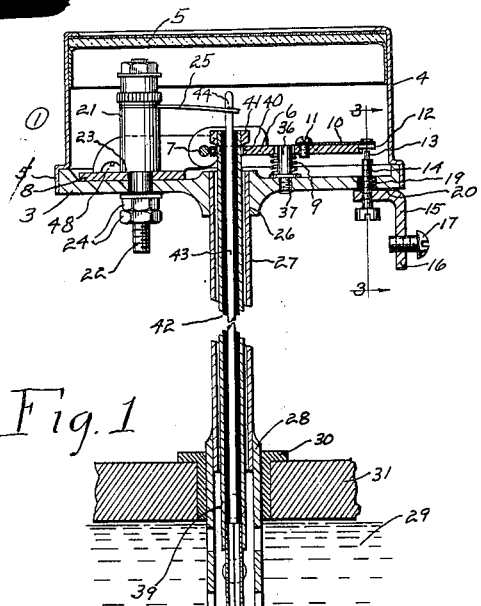
Fig.1
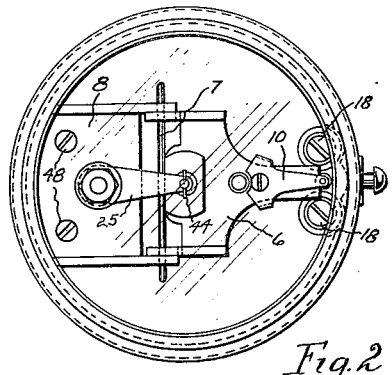
Fig.2
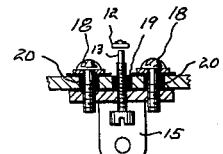
Fig.3
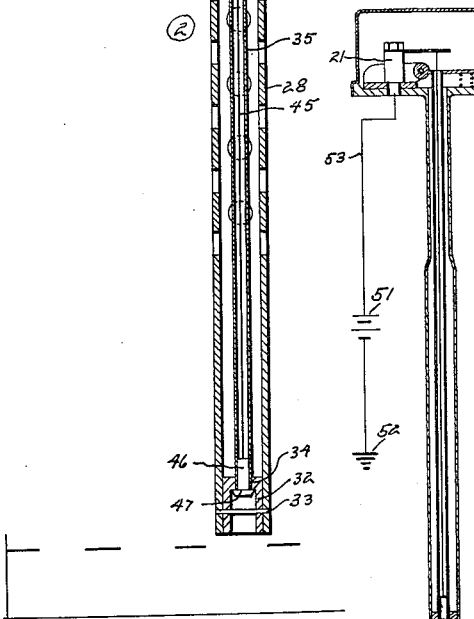
Fig.4
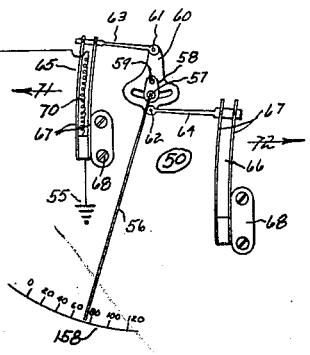
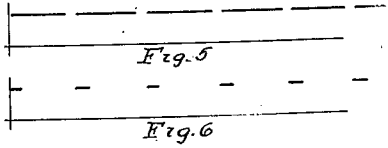
Inventor
Theodore J. Smulski
By Slough and Canfield
Attorney Patented Aug. 7, 1934

1,969,105

UNITED STATES PATENT OFFICE 1,969,105

THERMORESPONSIVE ELECTRIC CONTROLLER

Theodore J. Smulski, Gary, Ind., assignor to The Anderson Company, Gary, Ind., a corporation of Indiana Application October 4, 1930, Serial No. 486,414

10 Claims. (Cl. 177—351)

This invention relates to thermo-responsive controllers for electrically actuating or controlling apparatus of various kinds, in response to temperature changes at the controller.

It is one of the objects of my invention to provide a thermo-responsive electric controller of improved construction.

Another object of my invention is to provide a controller of the class referred to having a thermo-responsive element and adapted to control an electric circuit in response to temperature changes communicated to the element and in an improved manner.

Another object is to provide a controller of the class referred to having a thermo-responsive element and adapted to send current impulses over an electric circuit in accordance with temperature changes communicated to the element in an improved manner.

Another object is to provide a controller of the class referred to having a thermo-responsive element adapted to be projected into a body of liquid or other fluid of varying temperature and adapted to control an electric circuit in response to changes in the temperature of the fluid in an improved manner.

Another object is to provide, in the controller of the class referred to, a thermo-responsive element of improved construction adapted to operate an electric switch forming a part of the controller.

Another object is to provide, in a controller of the class referred to, a thermo-responsive element of improved construction adapted to be projected into a body of liquid or other fluid and adapted to operate an electric switch in an improved manner in response to temperature changes of the fluid.

Another object is to provide a controller of the class referred to having a thermo-responsive element and adapted to send over an electric circuit electric impulses of varying duration and varying intervals in response to variations of temperature communicated to the element.

Another object is to provide, for controlling apparatus of the class operating in response to a succession of electric impulses of varying duration and varying interval, an improved controller for sending out to said apparatus electric impulses of said character.

Another object is to provide, for controlling apparatus of the class operating in response to a succession of electric impulses of varying duration and varying interval, an improved controller for sending out to said apparatus electric impulses of said character responsive to changes of temperature at the controller.

Other objects will be apparent to those skilled in the art to which my invention appertains.

My invention is fully disclosed in the following description taken in connection with the accompanying drawing in which:

Fig. 1 is a longitudinal cross-sectional view of an embodiment of my invention;

Fig. 2 is a top plan view of the embodiment of the invention shown in Fig. 1;

Fig. 3 is a fragmentary sectional view taken from the plane 3—3 of Fig. 1;

Fig. 4 is a diagrammatic view illustrating in simplified form the embodiment of my invention of Fig. 1 controllingly associated with an indicating instrument;

Figs. 5, 6 and 7 are diagrammatic illustrations of current values occurring in the operation of my invention.

Referring to the drawing, I have indicated generally at 1 a controller head and at 2 a controller stem. The head 1 comprises a base 3, generally of circular disc-form provided with a hollow cylindrical inverted cup-like cover 4 having a transparent window 5 in the cup bottom, the cover 4 being flanged as at 5a to sealingly fit the circular periphery of the base 3, and to enclose and protect the parts mounted on the base 3 to be described.

A switch arm 6, generally horizontally disposed is rotatably mounted on a shaft 7, the latter being supported on the base 3 by a support 8 secured to the base as by screws 48—48. A compression spring 9 between the base and the switch arm tends resiliently to rotate the arm 6 upwardly as viewed in Fig. 1 around the bearing 7, the spring 9 being suitably positioned and guided by a stud 36 axially disposed in the spring and riveted to the base 3 as at 37.

A flat spring 10 is secured to the arm 6 by a screw 11 and carries on its outer end a contact 12 adapted to engage a contact point 13 disposed therebelow and formed on an adjusting screw 14 extending through the base 3 and threaded into an external bracket 15 secured to the base 3 by screws 18 and provided with a terminal portion 16 having a screw 17 for making electrical connection thereto. The bracket 15 is insulated from the base 3 by insulation at 20—20 around the screws 18—18 and between the bracket 15 and the base 3 in a well known manner, and the screw 14 is further insulated from the base by a bushing 19 in the base through which the screw passes.

An upright post 21 is mounted on the base 3 having a threaded portion of reduced diameter 22 extending through the base and a shoulder 23 resting on the support 8 and with a nut or nuts 24 on the threaded portion to secure the post rigidly on the base and to provide an electrical connection with the post. At the upper end of the post, a flat spring 25 is secured rigidly thereto and extends inwardly therefrom in a generally horizontal direction, and over-hangs the shaft 7 of the switch arm, for a purpose to be described.

The base 3 is provided with a substantially central boss 26 bored for rigid connection with a tube 27 inserted therein and preferably composed of invar or other material having substantially zero co-efficient of thermal expansion. The tube 27 extends a suitable distance from the base 3 and has rigidly connected to the outer end thereof, preferably by telescoping thereon coaxially therewith and soldering or brazing thereto, a tube 28 of copper or like material having a high co-efficient of thermal expansion.

The tube 28 is adapted to be inserted into a body of liquid or other fluid of variable temperature such as the fluid indicated at 29. In this connection, the tube 28 may be fitted into a bushing 30 inserted into a suitable bore in the wall 31 of the container of the fluid 29. The container 31 may, as will be understood, be a tank or reservoir or other fluid receptacle or may be a conduit through which the fluid 29 may flow.

The wall of the copper tube 28 is preferably perforated by a plurality of perforations 38—38 disposed longitudinally thereof, whereby the fluid 29 may fill the tube 28 and circulate around the tube 35 in contact therewith.

The outer end of the copper tube 28 is plugged by a cup-like plug 32 preferably of invar or other material of substantially zero co-efficient of thermal expansion, the cup being secured in the tube 28 by a pin 33. The inwardly disposed bottom of the cup is provided with a suitable perforation 34 into which is rigidly fitted the end of a tube 35 preferably of steel or other material having a low co-efficient of thermal expansion. The steel tube 35 is preferably disposed axially of and internally of the copper tube 28 and terminates adjacent the end of the copper tube 28 where it is rigidly telescopically connected to the outer end of a tube 39 of invar or other material of zero or negligible co-efficient of thermal expansion, the tube 39 continuing inwardly within and coaxial with the tube 27 and of smaller diameter than the latter and therefore freely axially movable therein. The inner end of the tube 39 extends through the base 3 and through a perforation 40 in the switch arm 6 and has on its inner end a head 41 engaging the upper side of the switch arm 6. The switch arm 6 is resiliently held in contact with the head 41 by the action of the spring 9, above described.

The invar tube 39 is lined with an insulating tube 42 and axially disposed therein is a loosely fitting copper wire or rod 43, the inner end of which extends through a perforation in the spring 25 and has a pin 44 diametrically projected therethrough and engaging the upper side of the spring 25. The outer end of the copper rod 43 terminates adjacent the inner end of the steel tube 35 and there is joined to a resistance wire 45 disposed axially of the steel tube 35, extending therethrough to the outer end thereof where it is joined to a plug 46 in the steel tube 35, the plug having a head 47 overlapping the bottom of the cup 32.

The spring 25 in the head 1 is disposed in relation to the parts described so that it tends to bend upwardly and thus it exerts an inward pull on the rod 43 and resistance wire 45, maintaining tension thereon to hold the wire 45 tight and keep it out of engagement with the wall of the tube 45 through which it extends, and the spring 25 also provides an electrical connection between the post 21 and said wire for a purpose to be described.

In the operation of the controller of Fig. 1 as thus far described, a connection may be made to the post 21 by the nuts 24 from any suitable source of current and current may flow through the post 21 and spring 25 into the copper rod 43 and through the resistance wire 45 to the steel tube 35, and the tube 39 and thence to the switch arm 6 and contact 12, and when the contacts 12—13 are closed, the current may flow out by way of an electrical connection to the screw 17 on the bracket 15.

As above referred to, the stem indicated generally at 2, in the practice of my invention, is inserted or projected into fluid indicated at 29, the temperature of which varies and responsive to which variations it is desired that the controller shall function. The temperature of the fluid 29 is communicated to the tube 28 and, due to the perforations 38, is communicated also to the steel tube 35 therewithin. The temperature of the fluid 29 is communicated to the tubes 28 and 35 and the tube 28 expands longitudinally more than the tube 35. This differential quantitative expansion results from constructing the tubes of different materials having different thermal expansion co-efficients and from providing them of approximately the same length.

The inner end of the tube 28, being secured to the base 3, its outer end moves axially and carries with it the outer end of the tube 35. The tube 35 is thus moved bodily axially and its inner end, through the agency of the head 41, rocks the switch arm 6 against the pressure of the spring 9 and closes the contacts 12—13. Current may now flow from the post 21 through the spring 25, through the rod 43 and resistance wire 45, tube 35, tube 39, switch arm 6, contacts 12—13 and connection 16—17. The current thus flowing heats the wire 45, and the heat thereof is communicated to the steel tube 35, heating it independently of the tube 28 and to a higher degree than the tube 28 and the tube 35 accordingly expands longitudinally. Its outer end being fixed by the connection with the tube 28, its inner end moved longitudinally raising the head 41 and permitting the spring 9 to open the contacts 12—13 and break the electric circuit, stopping the flow of current in the wire 45.

The temperature of the tube 35 therefore may now fall, permitting the tube 35 to contract and repeating the cycle of operations just described.

At a constant temperature of the fluid 29, the copper tube will remain extended a fixed amount, the heat from the tube 35 being conducted therefrom by convection and conduction into the fluid in the tube 28 and thence through the perforations 38 into the external fluid. In the case of fluid flowing through a conduit, the dissipation of heat from the tube 35 is substantially uneffected by the rate of flow, the perforations 38 obstructing the flow so that the rate of dissipation of heat from the tube 35 is substantially uneffected by the rate of flow. Therefore, at such constant fluid temperature, the tube 35 continuously periodically expands and contracts, periodically opening and closing the contacts 12—13. If the temperature of the fluid is high and the corresponding elongation of the tube 28 is great, the contacts 12—13 will remain closed during a relatively long interval due to the greater length of time required to heat up the tube 35 sufficiently to open them. At the moment of opening and breaking the current, the tube 35 will begin to cool off and contract, and due to its relatively high temperature, it will begin to cool relatively rapidly and will close the contacts 12—13 again after a relatively short open interval, it being well understood that the higher the temperature of the tube 35, the more rapidly will it dissipate heat into the surrounding fluid medium. On the other hand, if the temperature of the fluid 29 be relatively low, and the expansion of the tube 28 relatively slight, a smaller amount of heat will be required to heat up the tube 35 sufficiently to open the contacts 12—13 and they will therefore open after a relatively short interval. Also, in such a case, the tube 35 being heated to a relatively low degree, will cool off relatively slowly, thus holding the contacts 12—13 open during a relatively long period.

As a result, when the temperature of the fluid 29 is relatively high, a series of current impulses will flow through the circuit connected to the points 21 and 17, the intervals of current flow being long and the intervals of current cessation relatively short, as indicated diagrammatically in Fig. 5; and when the temperature of the fluid 29 is relatively low, the corresponding impulses of current will be such as indicated diagrammatically in Fig. 6, in which the intervals of current flow are relatively short and the intervals of cessation of current relatively long.

In either case of relatively high or relatively low fluid temperature, there will be, as indicated and described above, a time interval of definite length during which the contacts 12—13 are completely separated and the circuit completely broken. It is highly desirable that the contacts 12—13 be thus completely opened and the current completely interrupted. In the controller above described, this will invariably occur because the temperature of the resistance wire 45 will always be higher than that of the tube 35 and the tube 35 will continue to expand as its temperature approaches that of the wire 45. Thus, even after the contacts 12—13 have separated and the current has been broken, and even during the very short interval of time during which the slight arc at the contacts 12—13 exists and reduces the current flow before it is actually broken, the temperature of the tube 35 continues to rise in its progress toward the temperature of the wire 45, thus continuing to move the contacts 12—13 farther apart. Thus, by the construction which I have provided, there is no tendency for the contacts 12—13 to close immediately upon opening and no tendency for them to stop opening and begin to close before actually breaking the arc thereat and thus the operation of the controller is rendered certain, positive and predeterminable.

The tendency just referred to of the tube 35 to continue to expand after the current is broken or after it tends to be reduced by the resistance of the arc at the contacts, may be described as thermal inertia, that is the incapacity of the heat of the wire to be communicated to the tube 35 instantaneously, requiring instead an interval of time for transmission from the wire to the tube 35. This interval of transmission and therefore the degree of thermal inertia may be controlled by suitably proportioning the temperature gradient from the wire 45 to the tube 35 as by adjusting the wire temperature and the cross-sectional dimensions of the tube.

In some instances, it may be suitable to provide the tubes 28 and 35 of material having the same or substantially the same co-efficient of expansion and by providing a tube 35 shorter than the tube 28.

The current impulses of Figs. 5 and 6 or similar intermediate impulses or continuously varying impulses sent out from the controller of Fig. 1 in correspondence to the constant or variable temperature of the fluid 29 into which the stem 2 is projected, may be variously applied to practical uses. In Fig. 4 I have illustrated one such use. In that figure the controller of Fig. 1 is reproduced in simplified diagrammatic form, and in connection with the supply circuit and with a temperature indicating or measuring instrument indicated generally at 50. A battery 51 having a ground connection 52 supplies current by the wire 53 to the post 21 and in the manner above described, current impulses will be sent out over the wire 54 from the contact screw 14, and after passing through the instrument 50, may have a return ground connection 55.

The instrument 50 may be of any suitable construction, the form illustrated being more completely shown and described in a patent application co-pending herewith and a brief description thereof herein will suffice.

A pointer or needle 56 is mounted on a shaft 57, rotatably supported in the stationary frame of the instrument not shown, but the construction will be understood if the axis of the shaft 57 be considered as stationary in space.

The needle 56, upon rotation of the shaft 57, indicates temperature on a scale 158 calibrated in degrees. The shaft 57 has secured thereon an arm 58. A rocking lever 60 has oscillatory bearing on the arm 58 at 59. The lever 60 has pivot bearings 61 and 62 thereon on opposite sides and equally spaced from the bearing 59. A pair of connecting rods 63 and 64 have pivot bearings at 61 and 62 at one end thereof and at the other end are connected respectively to thermo-responsive devices 65 and 66 respectively.

The thermo-responsive devices 65 and 66 comprise one or more bi-metallic strips 67, the free ends of which are connected to the connecting rods 63 and 64 and the other ends of which are anchored to rigid supports 68—68. The thermo-responsive device 65 has associated therewith a heating coil 70 through which the said current impulses from the controller flow. In the absence of current in the coil 70, the thermo-responsive devices 65 and 66 respond only and equally to local temperature such as room or atmospheric temperature. A rise of local temperature will actuate the device 65 to bend in the direction of the arrow 71 and will actuate the device 66 to bend in the direction of the arrow 72.

The equal movements of the free ends of the strips 67 of the two devices acting through the connecting rods 63 and 64 will rotate the two pivot bearings 61 and 62 of the lever 60 around the bearing 59 on the arm 58 through equal arcs and therefore will communicate no movement to the arm 58 and thence no movement to the indicating needle 56. Thus any response of the device 65 to changes of room or atmospheric temperature, are exactly compensated or neutralized by the device 66. Current in the coil 70 however will bend the strips 67 of the device 65 only, independently of the device 66, and will resultantly move the pivot bearing 61 around the pivot bearing 62 as a center, rocking the lever 60. This movement of the lever 60 moves the bearing 59 and arm 58 thus rotating the shaft 57 and moving the needle 56.

It will thus be understood that the position of the needle 56 and its indication on the scale 158 will be determined by the temperature of the device 65. The device 65 may be constructed, by well known means, to have relatively great thermal inertia and therefore upon receiving a succession of current impulses, the strips 67 will be heated to a temperature corresponding to the integration of the current and time of the impulses, and if the thermal inertia of the device is relatively great, the movement of the strips 67 and therefore of the needle 56 will be very slow in response to the successive flow and cessation of current, and the needle 56 will take up a substantially motionless position on the scale 158.

It will therefore be clear that if the impulses of current are of the order illustrated in Fig. 5, the needle 56 will take up a position remote from zero in the counter-clockwise direction indicating high temperature, and vice versa if the impulses are of the order of Fig. 6.

The use above described for the controller of my invention is illustrative only, and my invention is not limited thereto, but is applicable to any use whatever in which a succession of current impulses of varying interval and duration may be employed to effect a desired result.

One of the advantages of my invention resides in the fact that the integration of the current impulses sent out by the controller is independent of the voltage of the source of the supply circuit, for example of the battery 51 of Fig. 4, that is to say, the indication of temperature effected by the position of the needle 56, on the scale 158, Fig. 4, will not be variably affected by variable voltage of the source 51. If the voltage of the source 51 should increase, the current impulses, such as those in Fig. 5, will correspondingly be increased in amperes, but the duration of the impulses will be decreased and the interval between impulses will be increased. The effects of an increase of voltage occurring for conditions illustrated by Fig. 6 are illustrated in Fig. 7. Thus the controller automatically compensates for changes of voltage of the source. This inherent compensating feature will be understood by reference to Fig. 1.

The tube 28 elongates a certain amount in correspondence with the temperature of the fluid 29 and thus moves the inner end of the tube 35 with it that amount, closing the switch contacts 12—13, and heating the tube 35. The tube 35 then successively expands and contracts opening and closing the contacts 12—13 and thus it is heated to some average temperature corresponding to the amount its inner end is moved by elongation of the tube 28. The said average temperature of the tube 35 will be maintained, for a constant temperature of the fluid 29, regardless of the exact frequency and duration of the impulses heating it. If, due to changes of voltage, greater current flows, the duration of said greater current impulses will generally be less and the frequency of such impulses will generally correspondingly change to effect the said average temperature.

My invention is not limited to the exact details of construction shown and described.

Many changes in and modifications of the described and illustrated embodiment of my invention may be made within the scope thereof and without sacrificing its advantages.

I claim:

1. In an electrical controller, a pair of thermally extensible elements, an electric circuit controlling means, connecting means associated with the said elements and said controlling means whereby relative extension of one element resulting from thermally effected changes of length thereof may be communicated to the other element to cause it to move said controlling means to close said circuit, the other of said elements adapted to be heated by current in the circuit and to be thermally extensible thereby to effect the opening of said circuit by said controlling means.

2. In an electrical controller, a pair of thermally responsive elements, an electric circuit controlling means, connecting means associated with said elements and said controlling means whereby relative movement of one element resulting from thermally effected dimensional change thereof may be communicated to the other element to cause it to move said controlling means to close said circuit, the other of said elements being in said circuit and adapted to be heated by current in the circuit and to be thermally dimensionally changed thereby to effect the opening of said circuit by said controlling means.

3. In an electrical controller, an electric circuit controlling means, first and second thermally longitudinally extensible elements connected together at one end, the first element being connected at its other end to said circuit controlling means to effect operation thereof to open the circuit in response to thermally effected longitudinal extension of the element heating means disposed adjacent said element and in said circuit and the second element being fixed at its other end whereby upon longitudinal thermal extension it may move the first element to effect operation of the controlling means to close the circuit.

4. In an electrical controller, an outer tubular thermally extensible element, an inner tubular thermally extensible element disposed within the outer element, the two elements being connected together at one end, an electric circuit controlling means connected to the inner element at its other end to effect operation of the controlling means upon the occurrence of thermally effected extension of the inner element, a heating element within the inner element and in said circuit and the inner element being thermally extensible by heat therefrom to effect the opening of the circuit by said controlling means the outer tubular element being fixed at its other end whereby upon thermal extension thereof it may effect operation of the controlling means to close the circuit.

5. In an electrical controller, an outer tubular thermally extensible element, an inner tubular thermally extensible element disposed within the outer element, the two elements being connected together at one end, an electric circuit controlling means connected to the inner element at its other end to effect operation of the controlling means upon the occurrence of thermally effected extension of the inner element, a heating element within the inner element and in said circuit and the inner element being thermally extensible by heat therefrom to effect the opening of the circuit by said controlling means, and the inner element being adapted to be bodily moved by thermally effected extension of the outer element to effect the closing of said circuit.

6. In an electrical controller, an outer tubular thermally extensible element, an inner tubular thermally extensible element disposed within the outer element, the two elements being connected together at one end, and extensible by different amounts upon an increase of temperature, an electric circuit controlling means connected to the inner element at its other end to effect operation of the controlling means upon the occurrence of thermally effected extension of the inner element, a heating element within the inner element and in said circuit and the inner element being thermally extensible by heat therefrom to effect the opening of the circuit by said controlling means, the tube wall of the outer element being provided with a plurality of perforations therein to permit contact with both tubular elements of fluid into which the outer element may be inserted and the inner element effecting operation of the controlling means by the differential of extension of the two tubular elements responsive to temperature of the liquid.

7. In an electrical controller, an outer tubular thermally extensible element, an inner tubular thermally extensible element disposed within the outer element, the two elements being connected together at one end and extensible by different amounts for an increase of temperature, an electric circuit controlling means connected to the inner element at its other end to effect operation of the controlling means upon the occurrence of thermally effected extension of the inner element, a heating element within the inner element and in said circuit and the inner element being thermally extensible by heat therefrom to effect the opening of the circuit by said controlling means, and the inner element being adapted to be bodily moved by thermally effected extension of the outer element to effect the closing of said circuit, the tube wall of the outer element being provided with a plurality of perforations therein to permit contact with both tubular elements of fluid into which the outer element may be inserted and the inner element effecting operation of the controlling means by the difference of the extension of the two elements responsive to temperature of the liquid.

8. In an electrical controller for controlling an electric circuit responsive to changes of temperature of a body of fluid within a walled container, conduit or the like, a perforated thermally extensible outer tubular element adapted to be projected through a perforation in the wall of the container, conduit or the like into contact with liquid therein, an inner thermally extensible tubular element longitudinally disposed within the outer element and connected thereto at one end within the said container, conduit or the like, the two elements being extensible by different amounts upon the given rise of temperature, a controller base element connected to the outer element, an electric circuit controlling element on the base connected to the other end of the inner element and operable upon longitudinal movements of the inner element to control the circuit, an electric heater for the element disposed therewithin and in said circuit, the inner element having a portion movable an amount commensurable with the differential extension of the two elements upon longitudinal extension of the inner and outer elements responsive to temperature changes of the fluid and operable to close the circuit, the inner element being thermally extensible by the heat of said heating element to effect opening of the circuit.

9. In an electrical controller for controlling an electric circuit responsive to changes of temperature of a body of fluid within a walled container, conduit or the like, a perforated thermally extensible outer tubular element adapted to be projected through a perforation in the wall of the container, conduit or the like into contact with liquid therein, an inner thermally extensible tubular element longitudinally disposed within the outer element and connected thereto at one end within the said container, conduit or the like, the two elements being extensible by different amounts upon the given rise of temperature, a controller base element connected to the outer element, an electric circuit controlling element on the base connected to the other end of the inner element and operable upon longitudinal movements of the inner element to control the circuit, an electric heater for the element disposed therewithin and in said circuit, the inner element having a portion movable an amount commensurable with the differential extension of the two elements upon longitudinal extension of the inner and outer elements responsive to temperature changes of the fluid and operable to close the circuit, the inner element being thermally extensible by the heat of said heating element to effect opening of the circuit, said heater comprising a wire longitudinally disposed within the inner tubular element and radially spaced from the wall thereof.

10. In an electrical controller for controlling an electric circuit responsive to changes of temperature of a body of fluid within a walled container, conduit or the like, a perforated thermally extensible outer tubular element adapted to be projected through a perforation in the wall of the container, conduit or the like into contact with liquid therein, an inner thermally extensible tubular element longitudinally disposed within the outer element and connected thereto at one end within the said container, conduit or the like, the two elements being extensible by different amounts upon the given rise of temperature, a controller base element connected to the outer element, an electric circuit controlling element on the base connected to the other end of the inner element and operable upon longitudinal movements of the inner element to control the circuit, an electric heater for the element disposed therewithin and in said circuit, the inner element having a portion movable an amount commensurable with the differential extension of the two elements upon longitudinal extension of the inner and outer elements responsive to temperature changes of the fluid and operable to close the circuit, and thermally extensible by heat of said heating element to effect the opening of the circuit, said heater comprising a wire longitudinally disposed within the tubular element and radially spaced from the wall thereof and electrically connected to the inner tubular element at an end portion thereof.

THEODORE J. SMULSKI.